United States Patent
Ricard et al.

(10) Patent No.: US 7,164,909 B2
(45) Date of Patent: Jan. 16, 2007

(54) MULTI-STANDARD MOBILE TELECOMMUNICATIONS TERMINAL FOR USE BOTH IN A PUBLIC FIRST NETWORK AND IN A PREFERRED LOCAL SECOND NETWORK

(75) Inventors: Jocelyn Ricard, La Celle St Cloud (FR); Francis Bourque, Saint Lys (FR)

(73) Assignee: Alcatel, Paris (FR)

(*) Notice: Subject to any disclaimer, the term of this patent is extended or adjusted under 35 U.S.C. 154(b) by 1103 days.

(21) Appl. No.: 09/754,212

(22) Filed: Jan. 5, 2001

(65) Prior Publication Data

US 2001/0007821 A1 Jul. 12, 2001

(30) Foreign Application Priority Data

Jan. 6, 2000 (FR) .................................. 00 00121

(51) Int. Cl.
H04Q 7/20 (2006.01)
(52) U.S. Cl. ................ 455/426.1; 455/418; 455/552.1; 455/458; 455/456.1
(58) Field of Classification Search ............ 425/426.1, 425/418, 456.1, 453, 443, 446, 461, 434, 425/435.1, 423.1, 439, 436, 426, 445
See application file for complete search history.

(56) References Cited

U.S. PATENT DOCUMENTS

| | | | | |
|---|---|---|---|---|
| 5,675,629 A | * | 10/1997 | Raffel et al. ............. | 455/552.1 |
| 5,794,141 A | * | 8/1998 | Zicker ..................... | 455/418 |
| 5,875,400 A | * | 2/1999 | Madhavapeddy et al. ... | 455/458 |
| 5,920,815 A | * | 7/1999 | Akhavan .................. | 455/426.1 |
| 6,226,527 B1 | * | 5/2001 | Dalsgaard et al. ........ | 455/553.1 |
| 6,343,220 B1 | * | 1/2002 | Van Der Salm ......... | 455/552.1 |

FOREIGN PATENT DOCUMENTS

| | | |
|---|---|---|
| EP | 0 660 626 A2 | 6/1995 |
| EP | 0 781 064 A2 | 6/1997 |
| EP | 0 858 237 A2 | 8/1998 |

* cited by examiner

Primary Examiner—Joseph Feild
Assistant Examiner—Julio Perez
(74) Attorney, Agent, or Firm—Sughrue Mion, PLLC

(57) ABSTRACT

The invention relates to a multi-standard mobile telecommunications terminal adapted to operate with base stations of a public cellular network and at least one fixed part of at least one preferred cordless telephone local network, the terminal including communication means for communicating with each of said networks and switching means including means for searching for a fixed part of a local network and commanding the communication means to operate with one or the other of said networks according to the result of the network search conducted by the search means. The terminal further includes means for programming and processing events triggering a search for the fixed part or parts of the local networks in which the terminal can operate, said programming and processing means activating the search means on the occurrence of programmed triggering events.

10 Claims, 2 Drawing Sheets

MULTI-STANDARD MOBILE TELECOMMUNICATIONS TERMINAL FOR USE BOTH IN A PUBLIC FIRST NETWORK AND IN A PREFERRED LOCAL SECOND NETWORK

The present invention relates to telecommunications and more particularly to mobile telephone systems that can connect to a fixed telecommunications network.

BACKGROUND OF THE INVENTION

At present radio telecommunications networks mainly use digital signal transmission techniques. There are two main families of digital radiotelephone standards: mobile telephone standards for public cellular networks, such as the GSM, DCS and UMTS standards, and cordless telephone standards, such as the Bluetooth and DECT standards, enabling a cordless telephone to be connected to a fixed radio part connected to the fixed or "wired" network.

Standards such as the GSM standard have enabled widespread adoption of mobile telephones because they are user friendly and offer good call quality.

Similarly, cordless telephones to the DECT standard, for example, are increasingly popular with consumers because they allow users some freedom of movement.

To make the life of radiocommunications terminal users easier, it has been proposed to create multi-standard mobile terminals which can process calls in both families of standards without changing telephone handset. A multi-standard terminal then enables use of either a "mobile" link, i.e. a telecommunications link set up via a mobile telephone network, or a "fixed" link, i.e. a link set up via a fixed part of a preferred local network providing a direct connection to the public switched network.

Users can therefore use a fixed link when they are in the coverage area of a local network that the terminal can log onto, with the benefit of lower call charges.

By using a mobile link from the same handset, the user enjoys the advantages of the mobile network when moving around.

However, a problem with multi-standard terminals is how to define when to change from the fixed mode to the mobile mode and vice-versa, given that, to reduce call costs, the terminal should log onto a preferred local area whenever possible.

At present, two preferred local network search modes enabling a change to "fixed" mode are known in the art, namely an automatic mode and a manual mode.

In the automatic mode, the fixed part is searched for continuously, regardless of whether it is actually used or not. Thus the search is effected whether the terminal is in the coverage area of a preferred local network which it can log onto or not. This search for a fixed part leads to a high consumption of energy by the terminal, which considerably reduces its standby and talk times.

This problem is aggravated if the terminal is associated with a plurality of fixed parts, because it then searches continuously for all of them in the automatic mode. In the manual mode, the user switches the terminal from the "mobile" mode to the "fixed" mode or vice-versa. This is inconvenient for users, who must remember to switch mode each time they enter the coverage area of a preferred local network associated with their terminal. As the terminal can be used anywhere in the "mobile" mode, users can easily forget to switch to the "fixed" mode.

OBJECTS AND SUMMARY OF THE INVENTION

The present invention aims to alleviate the drawbacks of the prior art by proposing a multi-standard mobile telecommunications terminal whose standby and talk times can be optimized and whose quality of service can be improved.

To this end, the invention provides a multi-standard mobile telecommunications terminal adapted to operate with base stations of a public cellular network and at least one fixed part of at least one preferred cordless telephone local network, the terminal including communication means for communicating with each of said networks and switching means including means for searching for a fixed part of a local network and commanding the communication means to operate with one or the other of said networks according to the result of the network search conducted by the search means, the terminal including means for programming and processing events triggering a search for the fixed part or parts of the local networks in which the terminal can operate, said programming and processing means activating the search means on the occurrence of programmed triggering events.

The terminal according to the invention can have one or more of the following features:

- the user can program the programming and processing means to define triggering events individually for each local network,
- the triggering event is a predefined sequence of keystrokes associated with a command of the terminal other than the command which switches the communication means to operate with a preferred local network,
- it includes means for evaluating the traffic load of a local network as a function of time and the triggering event is the traffic load of the local network falling below a predefined threshold, in particular a threshold defined by the user,
- it includes means for storing the frequency of use of each network by the terminal and the switching means are activated by the programming and processing means as a function of the frequency of use of said networks by the user,
- it includes means for calculating probabilities of the frequency of use of each network by the terminal and the triggering event is the crossing of a probability threshold for the frequency of use in the local network,
- it includes means enabling the user to define said threshold value,
- it includes means for locating fixed parts of the local networks from information supplied by the public cellular network and the triggering event is the fact that the terminal is in a cell of the public network overlapping the coverage area of a cordless telephone local network,
- it includes means for storing the identity of the cell of the public network in which the local network is located and the triggering event is the reception of a signal representing the identity of the base station corresponding to the stored cell identity, and
- the switching means switch to a searched for local network only if said search means detect a signal transmitted by a fixed part of the searched for local network during a predefined time period after the occurrence of an associated triggering event.

BRIEF DESCRIPTION OF THE DRAWINGS

Other features and advantages will emerge from the following description, which is given by way of non-limiting example and with reference to the accompanying drawings, in which.

MORE DETAILED DESCRIPTION

Figure 1:
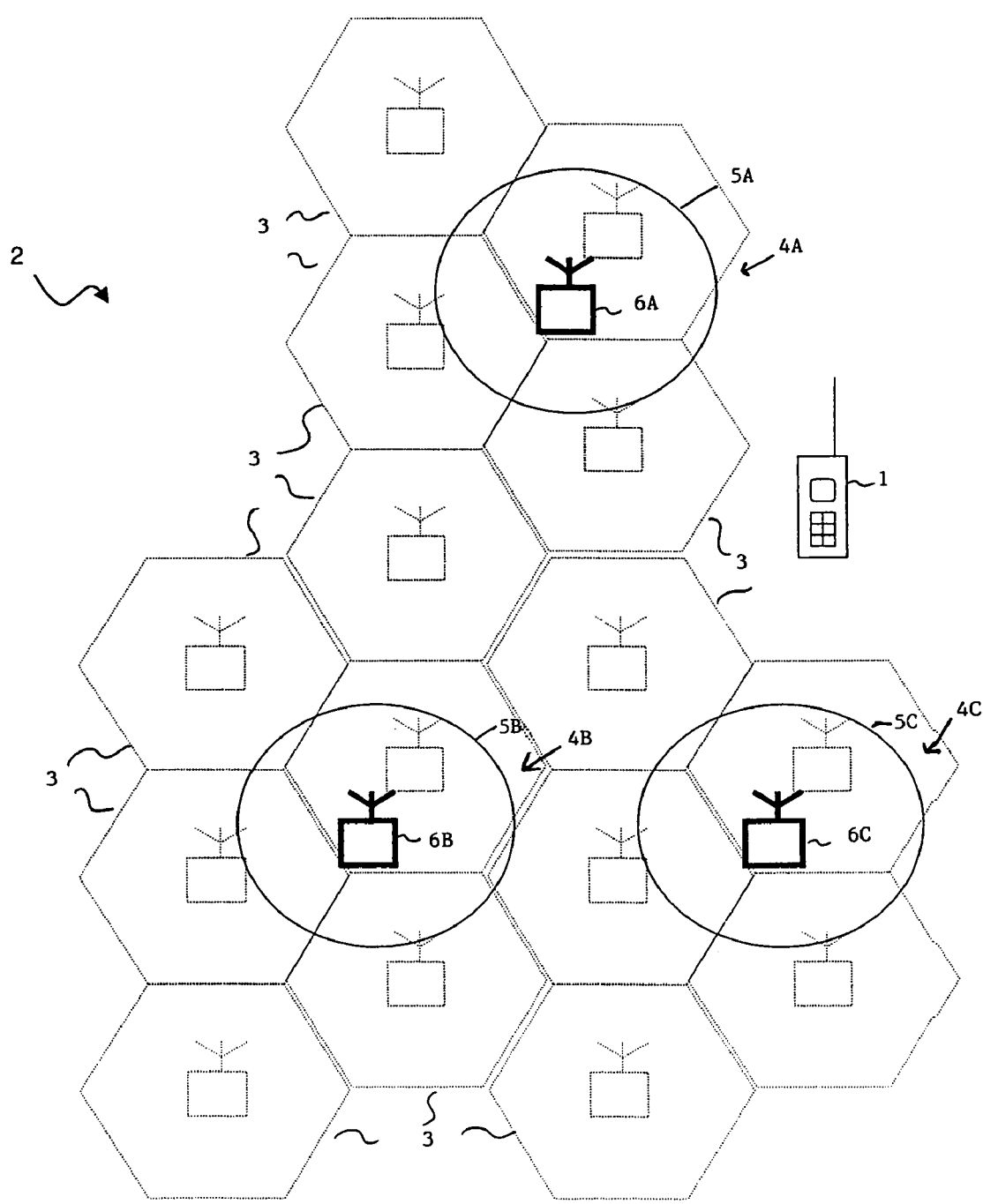
FIG. 1 is a block diagram of a terminal according to the invention in its environment.

FIG. 1 is a block diagram of a multi-standard mobile telecommunications terminal 1 which is adapted to operate in a GSM, DCS, UMTS or similar public cellular network 2, a few cells 3 of which and their base transceiver station are shown in dashed outline, and in one or more cordless telephone local networks 4A, 4B and 4C, e.g. DECT, CTS or Bluetooth networks, which are preferred networks and whose respective coverage areas 5A, 5B, 5C and respective associated fixed parts 6A, 6B and 6C are shown. The fixed parts 6A, 6B and 6C are more or less functionally equivalent to the base transceiver stations of the public cellular network.

In this embodiment of the invention, each preferred local network 4A, 4B, 4C includes only one fixed radio part 6A, 6B, 6C for connecting the terminal 1 directly to the public switched telephone network (PSTN), but each local network can of course include a plurality of fixed parts and have a larger coverage area than that shown by way of example in FIG. 1.

To illustrate the advantages of the invention, the network 4A represents that of the user's home, the network 4B that of the user's place of work and the network 4C, which is not much used, that of the user's second home.

Moreover, it is to be understood that the terminal 1 is authorized to log onto the fixed parts 6A, 6B, 6C of the local networks 4A, 4B and 4C.

When the terminal is in the coverage area 5A, 5B or 5C of one of the local cordless telephone networks 4A, 4B or 4C, it can operate equally well in the public cellular network 2 and in the cordless telephone local network in whose coverage area it is located.

When the terminal 1 is outside the coverage areas 5A, 5B and 5C of the local networks it can operate only in the public cellular network 2 and searching for a fixed part of one of the local networks 4A, 4B or 4C will necessarily fail and therefore constitute a waste of energy.

Because of the innovative features of the terminal 1 according to the invention, described hereinafter, this waste of energy can be considerably reduced and the standby time and talk time of the terminal can be increased.

The mobile terminal advantageously incorporates a specific configuration menu enabling the user to choose between different search modes for each local network. As described in more detail hereinafter, the user can program the various search modes for each local area according to their preferences and habits of use.

Figure 2:
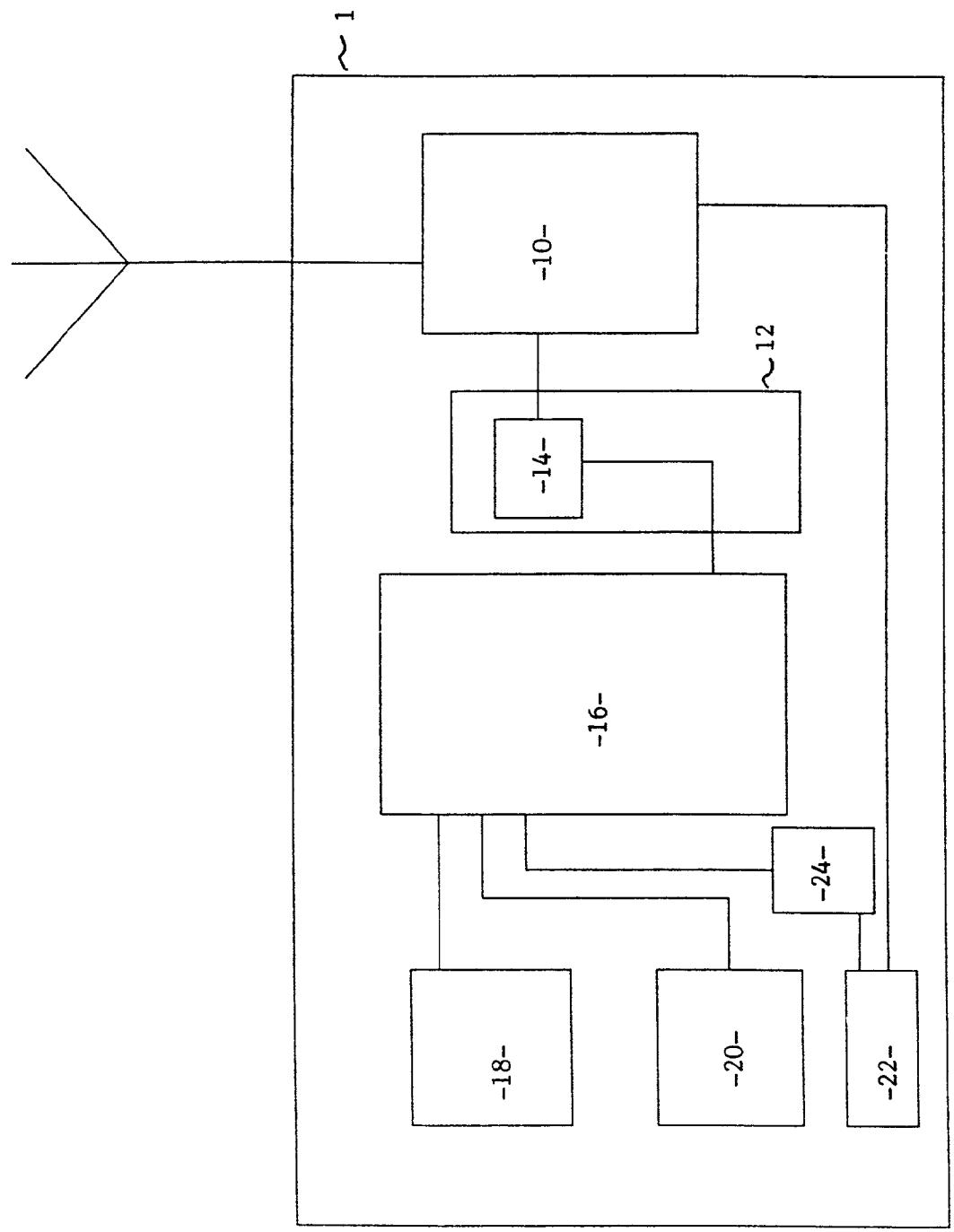
FIG. 2 is a block diagram of a terminal according to the invention.

Refer now to the FIG. 2 block diagram.

This figure shows that the terminal 1 includes communication means 10 for communicating with each of said networks 2, 4A, 4B and 4C.

It further includes switching means 12 for commanding the communication means 10 to operate with one particular local or public network.

However, switching from the public cellular network 2 to one of the local networks 4A, 4B or 4C is conditional on the reception of a service signal transmitted in response to a search for a cordless telephone local network by a fixed part of the local network. This checks beforehand that a call can be made to the cordless telephone local network whose fixed part the terminal according to the invention is searching for.

To this end, the switching means include means 14 for searching for a fixed part 6A, 6B or 6C that the terminal 1 is authorized to log onto.

In the event of positive search result, following radiocommunication via the communication means 10, the search means 14 receive a service signal indicating that a call can use the searched for local network.

In the event of a negative search result, no service signal is received and consequently it is not possible to switch to the searched for network.

To reduce fruitless searches for cordless telephone local networks without employing manual switching, which is irksome to the user, the terminal 1 includes means 16 connected to the switching means 12 for programming and processing events triggering a search for the fixed part or parts of the local networks in which the terminal can operate.

Following the occurrence of a triggering event, the programming and processing means 16 activate the search means 14 to search for one or more fixed parts of the preferred local networks with which the event in question is associated.

If the search leads to a positive result, as described above, then the switching means 12 command the communication means 10 to change operating mode and thereafter to route calls via the local network that the terminal has successfully logged onto.

The means 16 can preferably be programmed by the terminal user.

According to an additional feature of the present invention, the means 12 switch to a searched for local network only if the search means 14 detect a signal transmitted by a fixed part of the searched for local network during a limited period after the occurrence of the associated triggering event.

That limited period can be defined and programmed by the user or by the manufacturer of the terminal 1.

The triggering event is a keystroke or a predefined sequence of keystrokes on the terminal 1, for example.

In one particularly advantageous embodiment, a triggering event is a predefined sequence of keystrokes associated with a command of the terminal other than that to search for a preferred local network.

For example, if the terminal incorporates an electronic appointments diary or means for communicating via the Internet, consultation of business meetings or consultation of business electronic mail can be stored as events triggering the search for the local network 4B at the user's place of work.

The sequence of keystrokes can also be the entry of a particular telephone number with which the search of a preferred local network is associated.

In particular, a call to a local network other than that in which the terminal is located will not trigger a search for fixed parts associated with that other local network.

In another particularly advantageous embodiment, with a local network that is not used much by the user, for example the network 4C for the user's second home, the terminal 1 includes means 18 for locating the fixed parts of the local network as a function of information supplied by the public cellular network 2. The local means 18 receive an identifier of the cell of the public network 2 in which the terminal is located, for example.

In this case, the triggering event is the fact that the terminal is located in a cell of the public network overlapping the coverage area of a cordless telephone local network, for example. If the terminal 1 is in a cell of the public network 2 overlapping the coverage area 5C of the local network 4C, for example, there is a very high probability that it can log onto the fixed part 6C of that network and thereby obtain the benefit of lower call costs. The programming and processing means 16 start the search for the cordless telephone network associated with the triggering event if the location means 18 find the identifier of the cell in which the terminal 1 is located in a list stored and programmed by the user,.

Consequently, the search for a local network is started only when the geographical position of the terminal makes it probable that it can log onto a local network.

This search depending on the geographical position of the terminal can be made even more effective by taking more precise account of the characteristics of the cellular radio terrain around the fixed part of a particular local network.

In another embodiment, which can be combined with those described above, the terminal 1 includes means 20 for evaluating the traffic load of a local network as a function of time.

Information relating to the load of the network is obtained from a specific signal sent by a base station of the public network, for example, or from a signal transmitted by the fixed part of the local network.

In the present context, the expression "network load" refers to the parameter which measures the congestion (saturation factor) of the network or networks and provides information on the probable difficulty of connecting to a network because of saturation, for example. This can be important when the local network is intentionally undersized, for example because traffic peaks are relatively infrequent and do not justify the heavy investment that would be required to increase the capacity of the local network to enable it to connect a very large number of users.

For this embodiment, the triggering event is the traffic load of the local network falling below a predefined threshold, in particular a threshold defined by the user. Thus a fruitless search for the local network can be avoided if the network is saturated or almost saturated.

Of course, other criteria defined by the manufacturer of the mobile terminal, for example, and relating to the mobile terminal 1 and/or the fixed parts of the local networks can be taken into account in defining triggering events.

In another embodiment, the triggering event is defined relative to the habits of the user.

For example, users know that they are usually at home from 8 pm until 8 am the next day and at work between 8:30 am and 7 pm from Monday to Friday. They can therefore program these time periods into the means 16 in order to search for the appropriate local network, i.e. to search for the network 4A when they are usually at home and for the network 4B during working hours. Users are totally free to use this option and can define the search time periods themselves.

In a more sophisticated variant of this embodiment, the terminal includes means 22 for storing the frequency of use of each network by the terminal 1, covering not only the local networks 4A, 4B and 4C but also the public cellular network 2.

The frequency of use of a network by a terminal is the number of occasions per unit time that the terminal uses the network.

The terminal further includes means 24 connected to the means 22 for calculating the probability of use of each network by the terminal from the frequency of use stored in the means 22.

The probability of use is the probability that the user will use one of the local networks 4A, 4B or 4C or the public cellular network 2 at particular times of day or on particular days of the week.

For this embodiment, the triggering event is the crossing of a probability threshold for the use of a specific local network associated with the threshold. If the threshold is crossed, the means 24 send a signal to the means 16 to trigger a search for the local network associated with the triggering event.

The threshold can advantageously be defined by the user, using the terminal configuration menu.

This mode can be regarded as a self-adapting mode because it allows the habits of use of the terminal by the user to be taken into account automatically.

What is more, for each time period associated with the search for a particular fixed part, the user can define the search frequency, for example every x minutes, where x is an integer. Any other time unit can be used.

By virtue of the present invention, the user can choose a specific and suitable mode of searching for the fixed part of each local network that it can log onto.

This has the advantage that fruitless searches for a local network can be avoided and that a good part of the energy of the terminal can be saved. The terminal according to the invention is also easy to use and can adapt automatically to the habits of the user.

What is more, the various embodiments described above can be combined with each other.

The invention claimed is:

1. A multi-standard mobile telecommunications terminal adapted to operate with base stations of a public cellular network and at least one fixed part of at least one preferred cordless telephone local network, the terminal including communication means for communicating with each of said networks and switching means including means for searching for a fixed part of a local network and commanding the communication means to operate with one or the other of said networks according to the result of the network search conducted by the search means, the terminal including means for programming and processing events triggering a search for the fixed part or parts of the local networks in which the terminal can operate, said programming and processing means activating the search means on the occurrence of programmed triggering events.

2. A terminal according to claim 1, wherein the user can program the programming and processing means to define triggering events individually for each local network.

3. A terminal according to claim 1, wherein the triggering event is a predefined sequence of keystrokes associated with a command of the terminal other than the command which switches the communication means to operate with a preferred local network.

4. A terminal according to claim 1, including means for evaluating the traffic load of a local network as a function of time and wherein the triggering event is the traffic load of the local network falling below a predefined threshold, in particular a threshold defined by the user.

5. A terminal according to claim 1, including means for storing the frequency of use of each network by the terminal and wherein the switching means are activated by the programming and processing means as a function of the frequency of use of said networks by the user.

6. A terminal according to claim 5, including means for calculating the probability of use of each network by the terminal and wherein the triggering event for a local network is the crossing of a probability threshold for use of that network.

7. A terminal according to claim 6, including means enabling the user to define said threshold value.

8. A terminal according to claim 1, including means for locating fixed parts of the local networks from information supplied by the public cellular network and wherein the triggering event is the fact that the terminal is in a cell of the public network overlapping the coverage area of a cordless telephone local network.

9. A terminal according to claim 8, including means for storing the identity of the cell of the public network in which the local network is located and wherein the triggering event is the reception of a signal representing the identity of the base station corresponding to the stored cell identity.

10. A terminal according to claim 1, wherein the switching means switch to a searched for local network only if said search means detect a signal transmitted by a fixed part of the searched for local network during a predefined time period after the occurrence of an associated triggering event.

* * * * *